(12) United States Patent
Seo et al.

(10) Patent No.: US 8,744,500 B2
(45) Date of Patent: Jun. 3, 2014

(54) METHOD AND APPARATUS FOR MANAGING PUSH SERVICE

(75) Inventors: Myeong-Seong Seo, Gyeonggi-do (KR); Jae-Min Ahn, Gyeonggi-do (KR); Sang-Su Nam, Seoul (KR); Seong-Ho Cho, Seoul (KR); Kyoung-Yong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 13/451,080

(22) Filed: Apr. 19, 2012

(65) Prior Publication Data

US 2012/0270579 A1 Oct. 25, 2012

Related U.S. Application Data

(60) Provisional application No. 61/477,012, filed on Apr. 19, 2011.

(30) Foreign Application Priority Data

Apr. 13, 2012 (KR) .................. 10-2012-0038568

(51) Int. Cl.
*H04W 4/00* (2009.01)

(52) U.S. Cl.
USPC .............. 455/466; 455/412.1; 455/412.2; 455/435.1; 709/223; 709/206

(58) Field of Classification Search
USPC ......... 455/466, 412.1, 435.1, 412.2; 709/223, 709/206
See application file for complete search history.

(56) References Cited

U.S. PATENT DOCUMENTS

| 2004/0235464 | A1 | 11/2004 | Korkalo et al. |
| 2006/0106804 | A1* | 5/2006 | Chande .................. 707/10 |
| 2007/0073858 | A1* | 3/2007 | Lakshmi Narayanan et al. .................. 709/223 |
| 2010/0195576 | A1 | 8/2010 | Kong et al. |
| 2012/0047214 | A1* | 2/2012 | Daly et al. ............. 709/206 |

FOREIGN PATENT DOCUMENTS

| JP | 2004350054 | 12/2004 |
| KR | 100788245 | 12/2007 |
| KR | 1020080000103 | 1/2008 |
| KR | 1020100090201 | 8/2010 |
| WO | WO 2008/048075 | 4/2008 |
| WO | WO 2009/080605 | 7/2009 |

* cited by examiner

*Primary Examiner* — David Q Nguyen
(74) *Attorney, Agent, or Firm* — The Farrell Law Firm, P.C.

(57) ABSTRACT

An apparatus and a method for managing a push service used by an application, and a recording medium storing a program source for the method which includes, when there is a request for use of a push service from an application installed in a mobile station, determining whether another application using the push service exists, determining a message type of a message to be transmitted to a push server to make a push service registration request depending on the determination of another application using the push service, and configuring a message for a push service registration request according to a determined message type and transmitting the configured message to the push server.

21 Claims, 10 Drawing Sheets

METHOD AND APPARATUS FOR MANAGING PUSH SERVICE

PRIORITY

This application claims priority under 35 U.S.C. §119 to a U.S. Provisional Patent Application Ser. No. 61/477,012, which was filed in the United States Patent and Trademark Office on Apr. 19, 2011, and Korean Patent Application Serial No. 10-2012-0038568, which was filed in the Korean Intellectual Property Office on Apr. 13, 2012, the disclosures of each of which are incorporated herein by reference.

BACKGROUND OF THE INVENTION

1. Field of the Invention

The present invention relates generally to an application service, and more particularly to an apparatus and a method for managing a push service used by an application, and a recording medium storing a program source for the method.

2. Description of the Related Art

Recently, various communication terminals including smart phones and various services relating to applications installed in a communication terminal are in widespread use. Among those services, a push service, for notifying a user of useful information, even without a request from the user, is becoming more important. In a push service, when a specific event occurs at a preset time, specific information is sent to a user.

Schemes of providing a push service include a messaging push scheme using Short Message Service/Multimedia Message Service (SMS/MMS), an Internet Protocol (IP) push scheme in which a mobile station receives push data from a server in a state of maintaining a Transmission Control Protocol/Internet Protocol (TCP/IP)-based connection with the server, and a hybrid push scheme utilizing a combination of the SMS push scheme and the IP push scheme.

The SMS push scheme is disadvantageous in that the SMS push scheme is limited by the length of data transmitted from a server to a mobile station, provides no feedback for reporting success or failure of reception, and imposes high transmission costs.

Therefore, a recent trend is to use the IP push scheme. In the IP push scheme, a connection with a server needs to be maintained. Further, in the IP push scheme, since data transmission/reception occurs frequently, an efficient management of data traffic and reduction of power consumption have been important issues.

The conventional IP push scheme described above will be discussed in more detail with reference to FIG. 1.

FIG. 1 is a block diagram illustrating the conventional IP push scheme.

When there is a request for use of a push service from an application installed in a mobile station 110, the mobile station 110 transmits a message requesting registration of a push service for the application to a push server 120. The message requesting registration of the push service includes an identifier of the mobile station 110 and information of a corresponding application, and the information of a corresponding application may include an identifier of the corresponding application and version information.

Thereafter, the mobile station 110 transmits a mobile station authentication identifier received from the push server 120, together with information of the corresponding application, to an application server 130.

When push data occurs, the application server 130 transmits the push data, a mobile station authentication identifier, and application information to the push server 120. Then, the push server transmits the push data to the corresponding mobile station 110.

FIG. 2A illustrates a process flow of a message transmitted from a mobile station to a push server and an application server according to the conventional IP push scheme as described above.

Referring to FIG. 2A, when there is a request for use of a push service from one application among applications App. 1 and App. 2 installed in the mobile station 110, the mobile station 110 generates a message requesting registration of the push service for the corresponding application and transmits the generated message to the push server 120. FIG. 2B illustrates a construction of the message requesting registration of a push service. Referring to FIG. 2B, the message requesting registration of a push service includes an IP header 202, a TCP 204, message type information 206, apparatus information 208, and information 210 of an application requesting registration of the push service.

In addition, when there is a request for interruption of the use of the push service from one application among the applications App. 1 and App. 2 installed in the mobile station 110, the mobile station 110 generates a message requesting deregistration of the push service for the corresponding application and transmits the generated message to the push server 120. FIG. 2C illustrates a construction of a message for requesting deregistration of the push service. Referring to FIG. 2C, the message for requesting deregistration of the push service includes an IP header 202, a TCP header 204, message type information 206, apparatus information 208, and information 210 of an application requesting deregistration of the push service.

When information of the mobile station 110 has been registered to the push server 120 in response to the request for registration of the push service for one application among the applications installed in the mobile station 110, the mobile station 110 periodically transmits a periodic signal, known as "heartbeat", to the push sever 120 for a continuous connection with the push server 120. This operation is illustrated in FIG. 3A.

In FIG. 3A, a message expressed by "Type: H" indicates a heartbeat, and "period" refers to a transmission period of the heartbeat. FIG. 3B illustrates a construction of the heartbeat.

During the periodical transmission of such a heartbeat, when there is a request for use or interruption of the use of a push service from one application among the applications installed in the mobile station, the mobile station 110 generates a message (Push off notification or Push on notification) requesting deregistration or registration of the push service for the corresponding application and transmits the generated message to the push server 120.

Accordingly, as described above with reference to FIGS. 1 to 3, whenever there is a request for registration or deregistration of a push service, it is necessary to generate and transmit a signal for the request. Therefore, the related art is problematic in that it requires too much power consumption for the frequent signal transmission, which thus degrades the battery performance of a mobile station.

SUMMARY OF THE INVENTION

Therefore, the present invention has been made to solve the above-stated problems occurring in the prior art, and the present invention provides a scheme for managing a push service, which requires reduced power consumption.

Another aspect of present invention is to provide a message configuration scheme transmitted between a mobile station and a push server to efficiently manage a push service.

According to an aspect of the present invention, there is provided a method for managing a push service by a mobile station, the method including when there is a request for use of a push service from at least one application installed in a mobile station, determining whether another application using the push service exists; determining a message type of a message to be transmitted to a push server to make a push service registration request depending on the determination of another application using the push service; and configuring a message for a push service registration request according to a determined message type and transmitting the configured message to the push server.

According to an aspect of the present invention, there is provided an apparatus for managing a push service by a mobile station, the apparatus including a controller for, when there is a request for use of a push service from at least one application installed in a mobile station, determining whether another application using the push service exists, determining a message type of a message to be transmitted to a push server to make a push service registration request depending on the determination of another application using the push service, and then configuring a message for a push service registration request according to a determined message type; and a transceiver for transmitting the configured message to the push server.

According to an aspect of the present invention, there is provided a recording medium readable by a processor, in which a program for executing a method for managing a push service by a mobile station, the method including when there is a request for use of a push service from at least one application installed in a mobile station, determining whether another application using the push service exists; determining a message type of a message to be transmitted to a push server to make a push service registration request depending on the determination of another application using the push service; and configuring a message for a push service registration request according to a determined message type and transmitting the configured message to the push server.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described in detail with reference to the accompanying drawings. In the following description, detailed descriptions of well-known functions and configurations are omitted to avoid obscuring the description of the present invention.

As described above, a push service management method in the related art requires too frequent signal transmission for registration or deregistration of the push service, is inefficient and greatly degrades the battery performance of a mobile station.

Therefore, the present invention provides a scheme for minimizing the signals transmitted from a mobile station to a server, thereby improving battery performance.

When there is a request for use of a push service from one application among at least one application installed in a mobile station, the mobile station determines whether another application using the push service exists. When another application using the push service exists, information of the application requesting use of the push service is transmitted to a push service through a heartbeat. The fact that another application using the push service exists indicates that an application registered in a push server as an application using the push service exists.

When another application using the push service does not exist, the mobile station generates a separate request message requesting registration of the push service distinguished from the heartbeat and then transmits the generated request message to the push server. The fact that another application using the push service does not exist indicates that an application registered in a push server as an application using the push service does not exist.

When there is a request for interruption of the use of a push service from one application among at least one application installed in a mobile station, the mobile station determines whether another application using a push service exists. When another application using the push service exists, the mobile station transmits information of an application requesting interruption of the use of the push service to the push service through a heartbeat. When another application using a push service does not exist, the mobile station generates a separate request message requesting deregistration of the push service distinguished from the heartbeat and then transmits the generated request message to the push server.

Thus, depending on the existence or absence of another application using a push service, a mobile station makes a request for registration or deregistration of the push service either by using a heartbeat, or by using a separate message distinguished from the heartbeat.

Figure 4A:
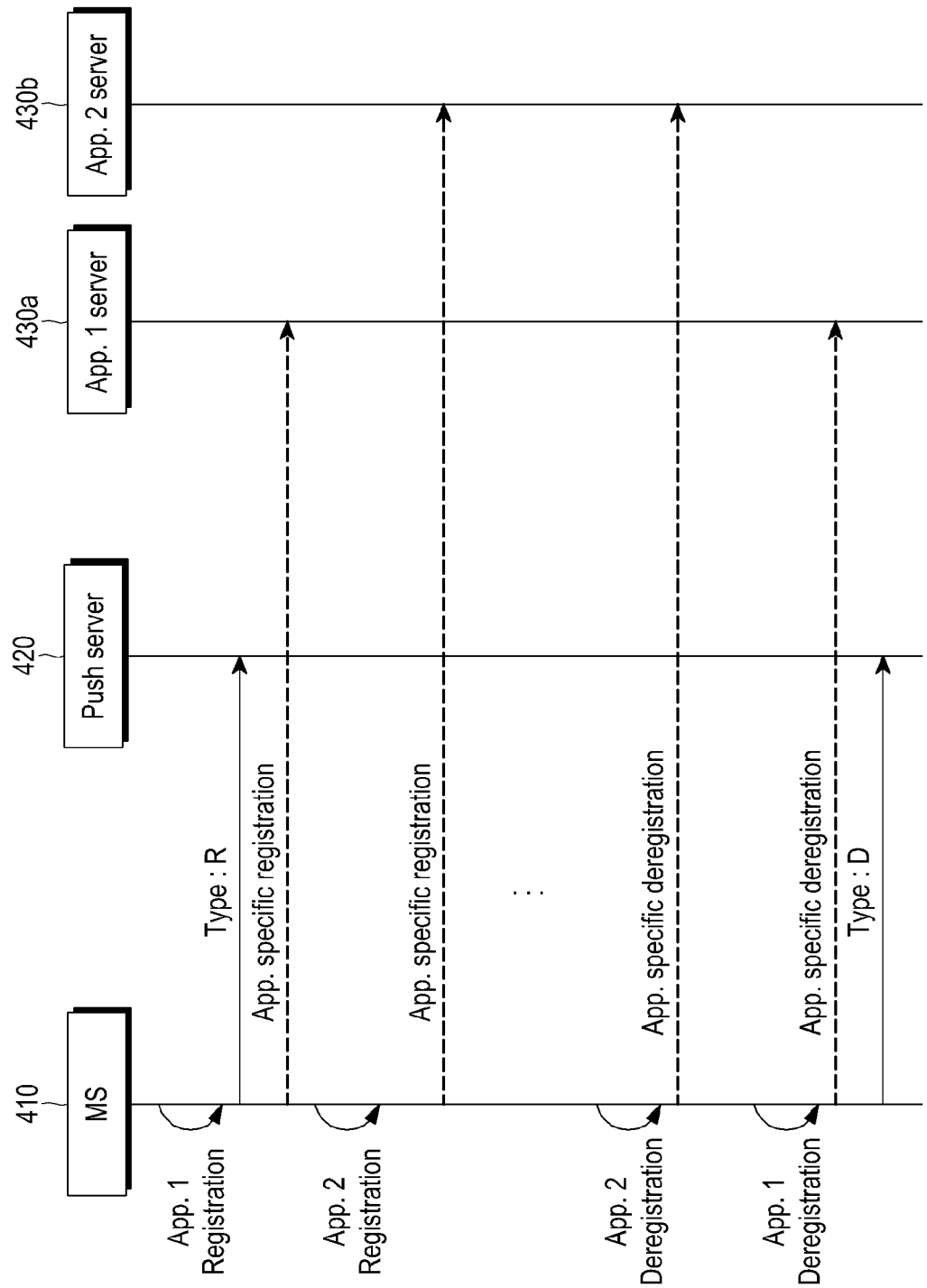
FIGS. 4A to 4D are diagrams illustrating examples of signal flows and constructions of messages transmitted from a mobile station for registration or deregistration of a push service according to an embodiment of the present invention.

The message flow from a mobile station to a push server and an application server according to an embodiment of the present invention is described referring to FIG. 4A. The following description referring to FIG. 4A is based on, for convenience of description, an assumption that two applications App. 1 and App. 2 have been installed in the mobile station.

Figure 4B:
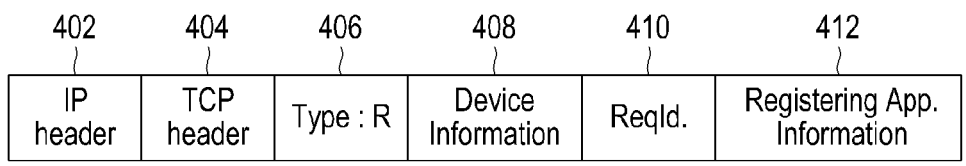

In a state in which the applications App. 1 and App. 2 installed in a mobile station 410 do not include an application using the push service, when there is a request for use of the push service from the application App. 1, the mobile station 410 generates a message (Type: R) requesting registration of a push service and then transmits the generated message to a push server 420. FIG. 4B illustrates a construction of the message transmitted to the push server.

Referring to FIG. 4B, the message requesting use of a push service includes an IP header 402, a TCP header 404, message type information 406, mobile station information 408, a request ID 410, and application information 412. The IP header 402 and the TCP 404 include addresses and port numbers of a starting point and a destination of the message. The message type information 406 indicates the type of the corresponding message, that is, it indicates whether the message is for a push service registration request or for a push service deregistration request, or corresponds to a heartbeat message. The mobile station information 408 is used for identifying the corresponding mobile station and may be, for example, an IMEI (International Mobile Equipment Identity) or IMSI (International Mobile Subscriber Identity) of the mobile station. The request ID 410 corresponds to an identifier of a corresponding packet and can be expressed by a cyclic bit. The request ID 410 may be used to identify a response message received from the push server. The application information 412 corresponds to information of the application requesting use of the push service, and may include an identifier and version information of the application.

Thereafter, the mobile station 410 transmits corresponding application information and mobile station authentication information received from the push sever 420 to application server 430a.

Then, when there is a request for use of the push service from the application App. 2, the mobile station 410 stores information of the application App. 2 in a memory. The mobile station 410 does not transmit a separate request message requesting registration of the push service to the push server 420. The mobile station 410 transmits corresponding application information and mobile station authentication information received from the push server 420 to application server 430b.

In the state in which both the applications App. 1 and App. 2 installed in the mobile station 410 are using the push service, when there is a request for interruption of the use of the push service from the application App. 2, the mobile station 410 stores the information of the application App. 2 in the memory. The mobile station 410 does not transmit a separate request message requesting deregistration of the push service to the push server 420.

Figure 4C:
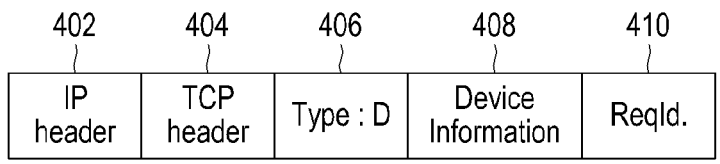

Thereafter, when there is a request for interruption of the use of the push service from the application App. 1, the mobile station 410 transmits a message requesting deregistration of the push service to the push server 420. FIG. 4C illustrates a construction of the message for requesting deregistration of the push service transmitted to the push server. Referring to FIG. 4C, the message for requesting deregistration of the push service includes an IP header 402, a TCP header 404, message type information 406, mobile station information 408, and a request ID 410. Respective fields of the message requesting deregistration of the push service are equal to those described above with reference to FIG. 4B, excluding only the differences that the message type information 406 indicates a message requesting deregistration of the push service and the fields do not include the application information.

After requesting registration or deregistration of the push service to the push server, the mobile station receives a signal reporting information on whether the corresponding request has been processed. Then, based on a report by the received signal, if the corresponding request has not been processed, the mobile station processes the corresponding request again.

Figure 4D:
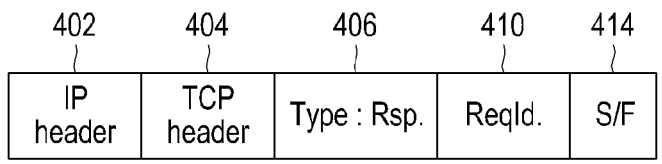

FIG. 4D illustrates a construction of the message reported by the signal received from the push server. Referring to FIG. 4D, the message reported by the signal received from the push server includes an IP header 402, a TCP header 404, message type information 406, a request ID 410, and information 414 indicating whether the request for registration or deregistration of the push service has been successfully processed. The message type information 406 of "rsp." indicates that the corresponding message is a response message to the request for registration or deregistration of the push service.

Figure 1:
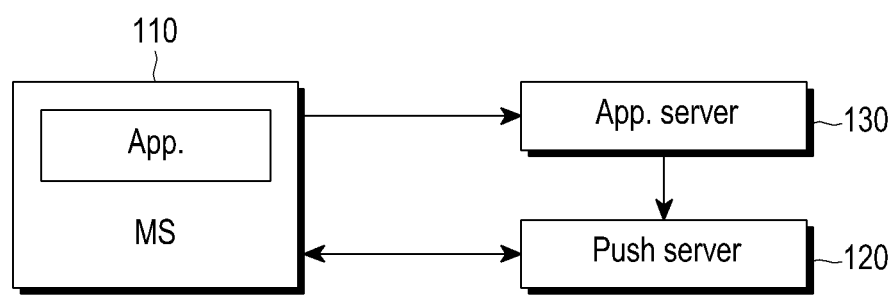
FIG. 1 is a block diagram illustrating a conventional IP push scheme.
Figure 2A:
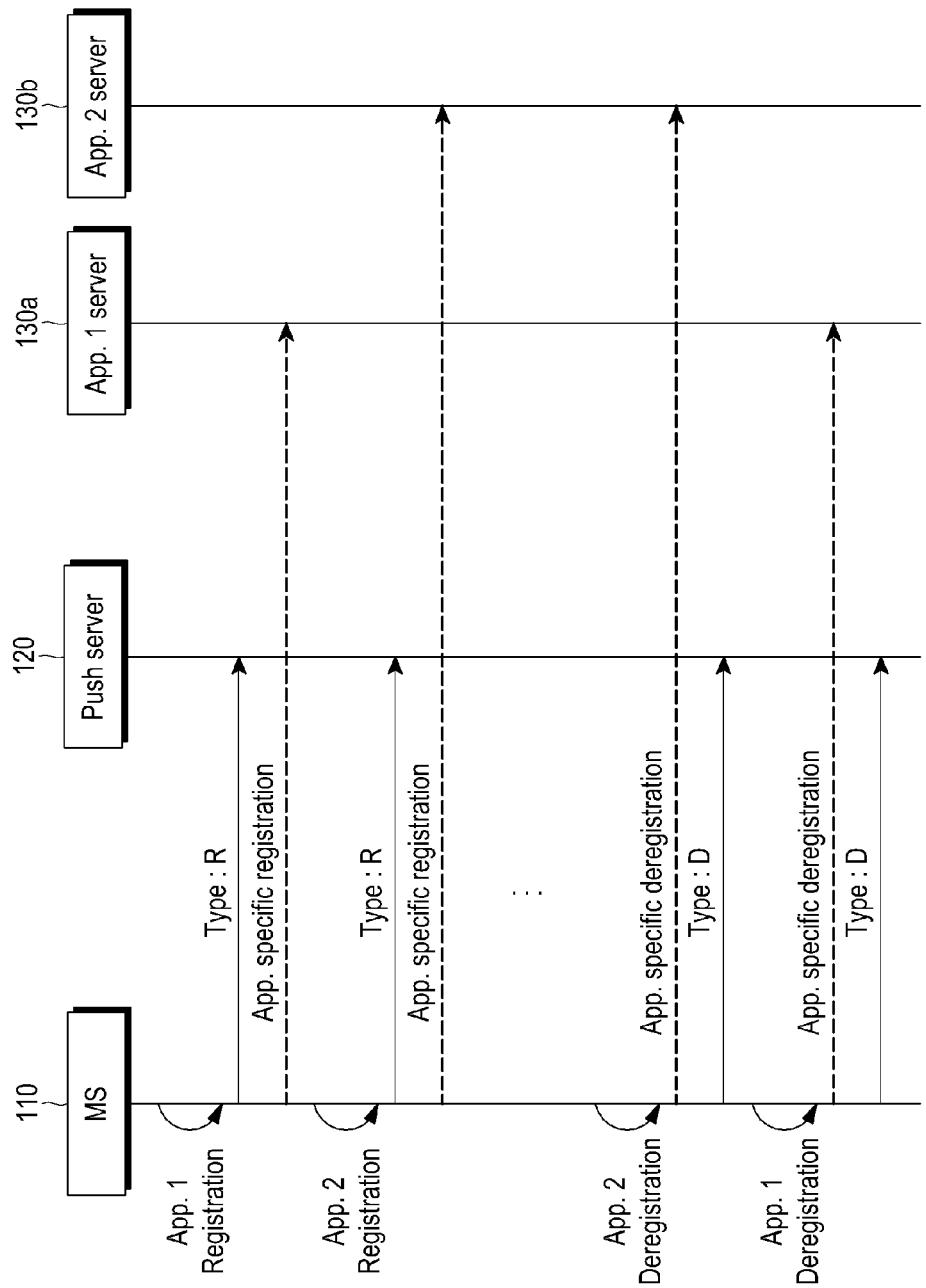
FIGS. 2A to 2C are diagrams illustrating examples of a signal flow and constructions of messages transmitted from a mobile station for registration or deregistration of a push service according to an IP push scheme.
Figure 2B:
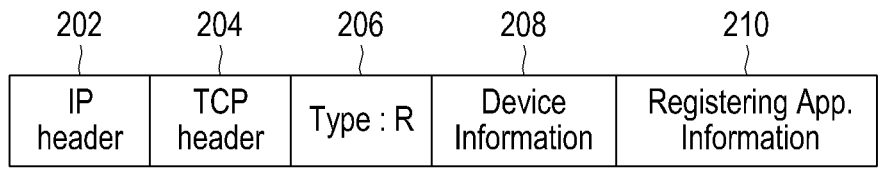
Figure 2C:
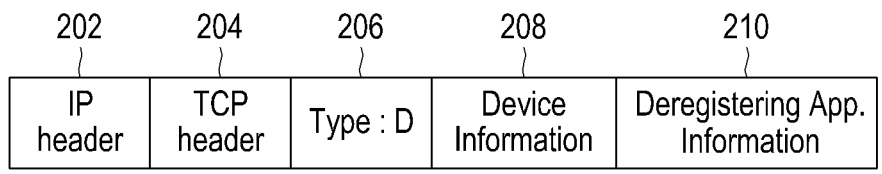
Figure 3A:
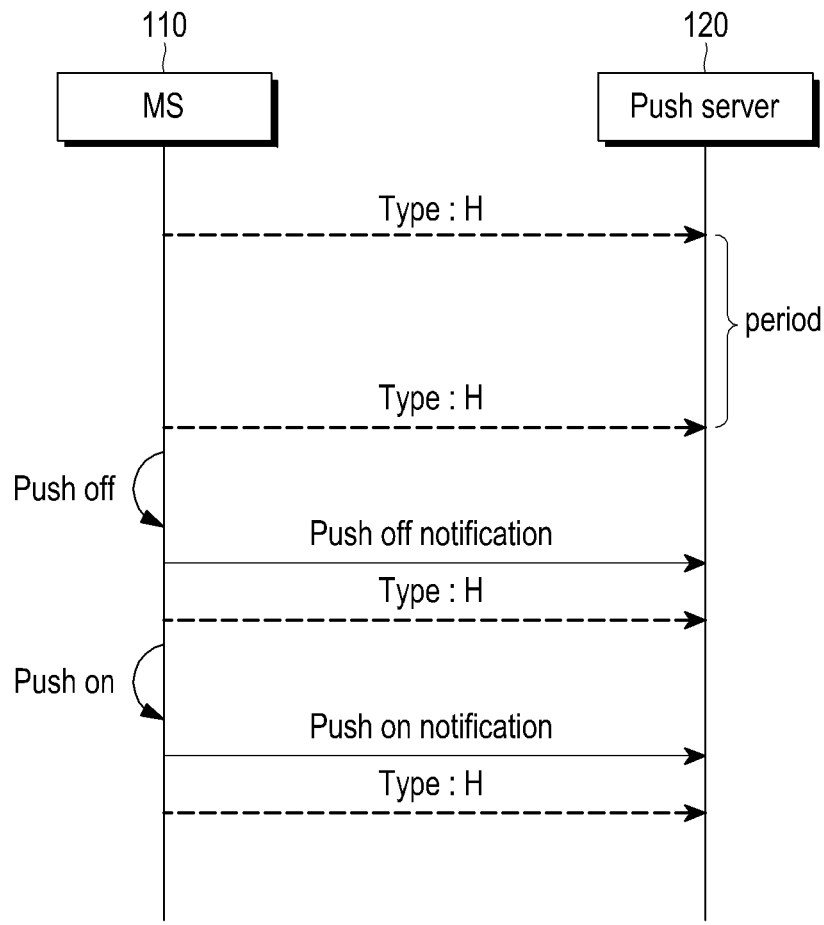
FIGS. 3A and 3B are diagrams illustrating examples of signal flows and a construction of a heartbeat transmitted from a mobile station in the IP push scheme.
Figure 3B:
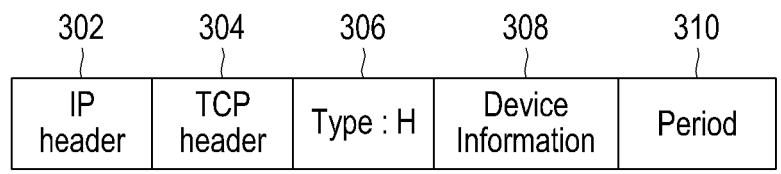

As described above with reference to FIG. 4, according to an embodiment of the present invention of the present invention, when there is a request for use of the push service or interruption of the use of the push service, if there is another application using the push service, the mobile station does not transmit a separate message requesting registration or deregistration of the push service to the push server 420, unlike described above with reference to FIG. 2A, and therefore the present invention can reduce separately transmitted messages, and reduces power consumption. When another application using the push service exists, the mobile station does not transmit a separate message requesting registration or deregistration of the push service to the push server 420 and instead stores information of the application requesting use of the push service or interruption of the use of the push service, and later transmits the corresponding request by using the heartbeat, as described in more detail with reference to FIG. 5.

Figure 5:
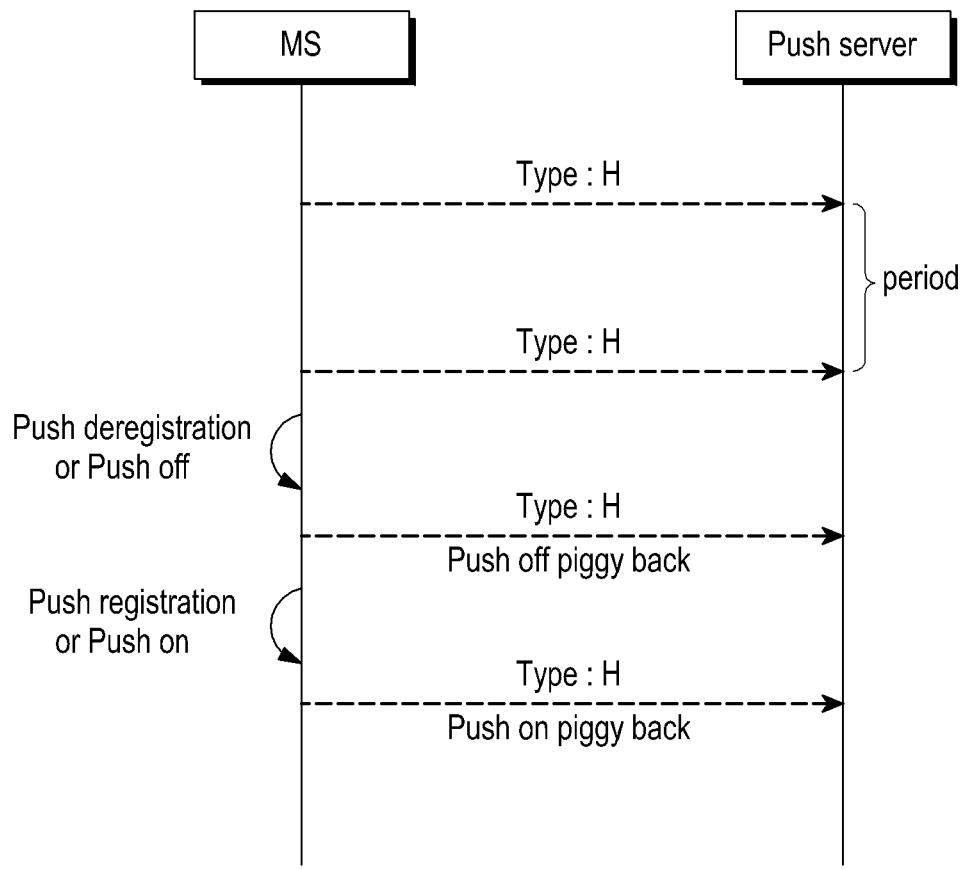
FIG. 5 is a signal flow diagram illustrating an example of a heartbeat transmitted from a mobile station according to an embodiment of the present invention.

FIG. 5 is a signal flow diagram illustrating an example of a process of requesting registration or deregistration of the push service by using a heartbeat. FIG. 5 illustrates a situation in which heartbeats are being transmitted between a mobile station and a server since an application using the push service exists.

As described above, according to the present invention, when there is a request for use of the push service or interruption of the use of the push service and another application using the push service exists, the mobile station transmits information requesting registration or deregistration of the push service by piggybacking the information onto the heartbeat. Here, a message expressed by "Type: H" is a heartbeat and "period" refers to a transmission period.

Figure 6:
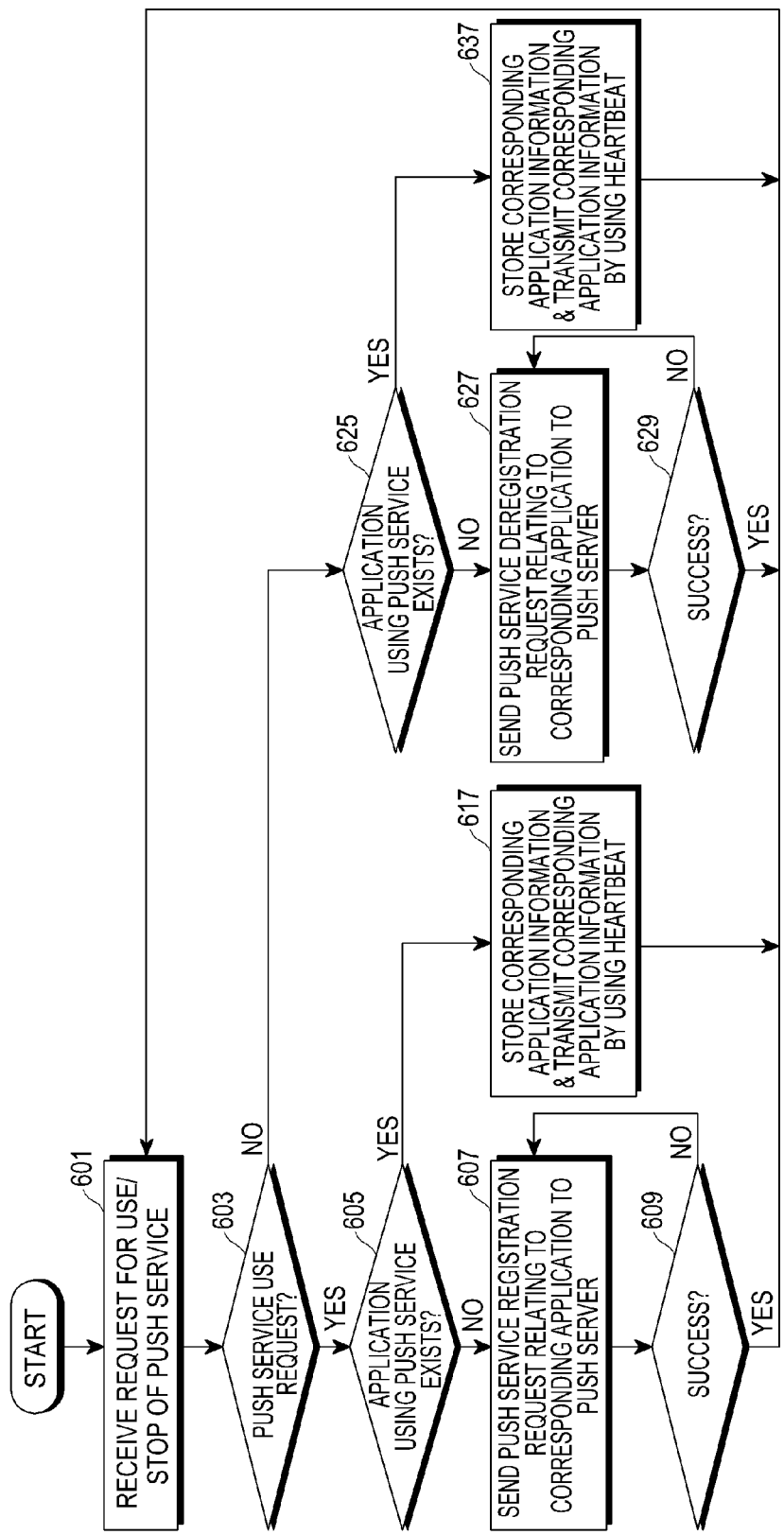
FIG. 6 is a flowchart illustrating an operation of managing a push service by a mobile station according to an embodiment of the present invention.

FIG. 6 is a flowchart illustrating an operation of managing a push service by a mobile station according to an embodiment of the present invention.

First, in Step 601, when there is an application requesting use of the push service or interruption of the use of the push service, the mobile station proceeds to Step 603.

In Step 603, the mobile station determines whether the request of the corresponding application is a request for use of the push service. When the request is a request for use of the push service, the mobile station proceeds to Step 605. Otherwise, the mobile station proceeds to Step 625.

In Step 605 to which the mobile station has proceeded based on a determination that there is a request for use of the push service from an application installed in the mobile station, the mobile station determines whether another application using the push service exists, i.e. whether an application registered in the push server exists. When another application using the push service does not exist, the mobile station proceeds to Step 607. When another application using the push service exists, the mobile station proceeds to Step 617.

In Step 607, the mobile station generates a request message requesting registration of the push service for the corresponding application and transmits the generated request message to the push server, and then proceeds to Step 609. As described above with reference to FIG. 4B, the request message requesting registration of the push service includes information of the corresponding mobile station and information of the corresponding application.

In Step 609, based on a signal received from the push server, the mobile station determines whether registration of the push service request has been successfully processed. When registration of the push service request has been successfully processed, the mobile station proceeds to Step 601. Otherwise, the mobile station proceeds to Step 607, in which the mobile station makes a request for registration of the push service.

In Step 617 to which the mobile station has proceeded based on a determination in Step 605 that another application using the push service exists, the mobile station stores information of the application currently requesting use of the push service in a memory, and then transmits the stored information of the application by piggybacking the information onto the heartbeat at the time of transmitting the heartbeat. That is, the mobile station performs registration of the push service request for the corresponding application by using the heartbeat.

In Step 625 to which the mobile station has proceeded based on a result of the determination in Step 603 that the request from the corresponding application is not a request for use of the push service but a request for interruption of the use of the push service, the mobile station determines whether another application using the push service exists. When another application using the push service does not exist, the mobile station proceeds to Step 627. When another application using the push service exists, the mobile station proceeds to Step 637.

In Step 627, the mobile station generates a request message requesting deregistration of the push service and transmits the generated request message to the push server, and then proceeds to Step 629. As described above with reference to FIG. 4C, the message requesting deregistration of the push service includes the corresponding mobile station information without including the application information.

In Step 629, based on a signal received from the push server, the mobile station determines whether the push service deregistration request has been successfully processed. When the push service deregistration request has been successfully processed, the mobile station proceeds to Step 601. Otherwise, the mobile station proceeds to Step 627, and makes a request for deregistration of the push service to the push server again.

In Step 637 to which the mobile station has proceeded based on a determination in Step 625 that another application using the push service exists, the mobile station stores information of the application currently requesting interruption of the push service to the memory, then transmits the corresponding application information by piggybacking the corresponding application information onto the heartbeat with reference to the information stored in the memory at the time of transmitting the heartbeat. That is, the mobile station performs the push service deregistration request for the corresponding application by using the heartbeat. Instead of piggybacking information of the corresponding application onto the heartbeat, the mobile station may piggyback and transmit bitmap information requesting deregistration of the push service for the corresponding application.

A push service management method performed by the mobile station has been described above with reference to FIG. 6. Hereinafter, process flows and constructions of messages transmitted between the mobile station and the push server will be described in more detail with reference to the related drawings.

Figure 7:
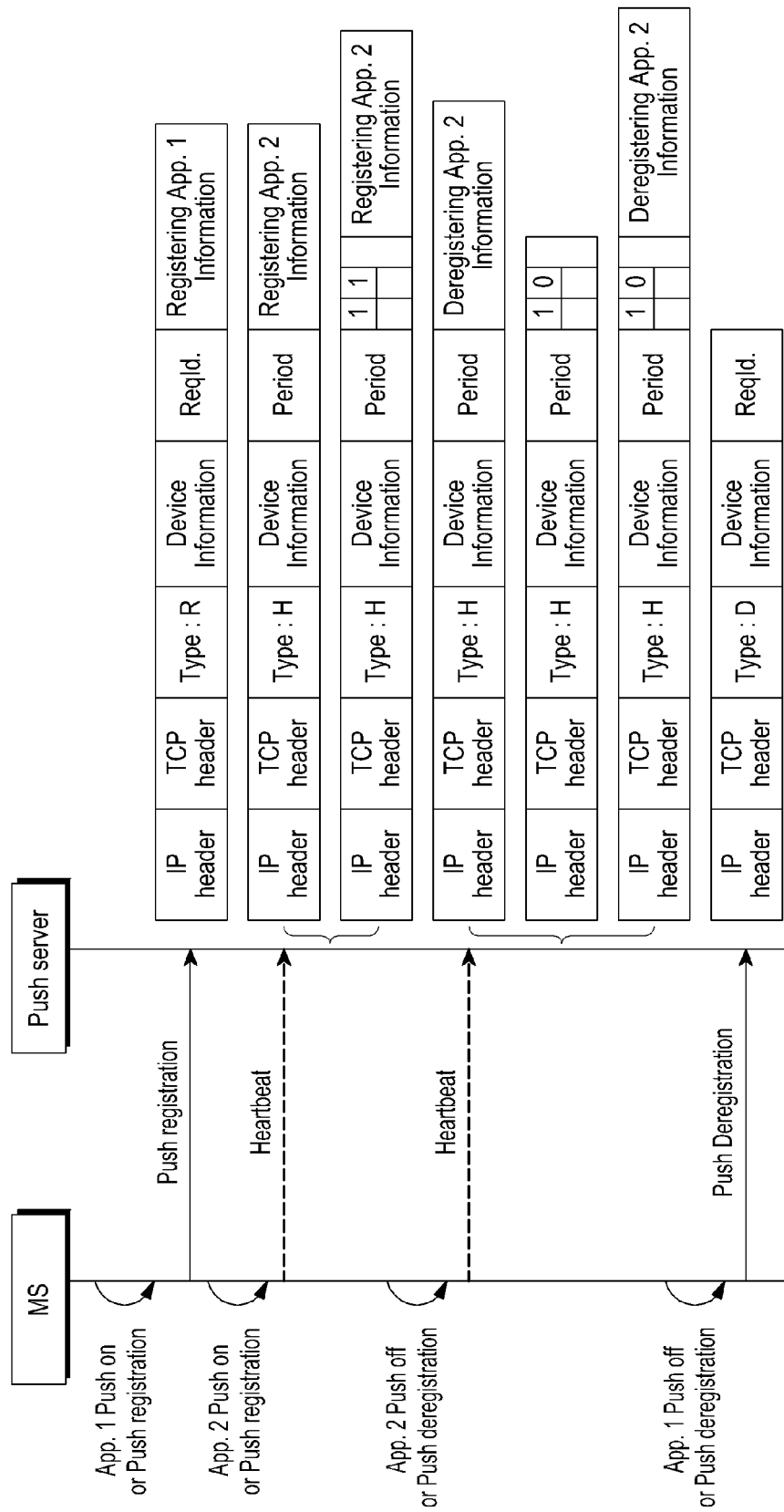
FIG. 7 is a signal flow diagram illustrating an example of process flows and constructions of messages transmitted between a mobile station and a push server according to an embodiment of the present invention.

FIG. 7 is a signal flow diagram illustrating an example of process flows and constructions of messages transmitted between a mobile station and a push server according to an embodiment of the present invention. In the following description with reference to FIG. 7, it is assumed that two applications App. 1 and App. 2 have been installed in the mobile station.

First, when one application App. 1 among the applications installed in the mobile station makes a request for use of the push service, the mobile station generates a message requesting registration of the push service and transmits the generated message to the push server. The message includes type information of the corresponding message, mobile station information, and information of the corresponding application. The push server analyzes the received message, performs an authentication process for the corresponding mobile station, and performs registration of the push service for the application App. 1.

After the push service of App. 1 is registered in the push server, the heartbeat is periodically transmitted from the mobile station to the push server for the consistent connection between the mobile station and the push server.

Thereafter, when the application App. 2 makes a request for use of the push service, the mobile station stores information of the application App. 2 in the memory, and then transmits the information of the application App. 2 to the push server by loading the information on the heartbeat at the time of transmitting the heartbeat. That is, the mobile station performs a request for registration of the push service for the application App. 2 by using the heartbeat. The push server receives the message transmitted using the heartbeat, and performs the registration of the push service for the corresponding application App. 2 by analyzing the received message.

The transmitted message may further include bitmap type information. Here, the bitmap type information refers to information indicating whether the applications registered in the push server have been set as applications using the push service in the mobile station, i.e. information indicating a push service use state in the mobile station. For example, when information of the bitmap type for an application indicates "0," it indicates that the application has made a request for non-use of the push service in the mobile station. According to an embodiment of the present invention, the bitmap type information may indicate only the state of use of the push service of the applications, which has been changed after previous transmission of the heartbeat. The state of use of the push service is piggybacked, together with the information of the applications having a changed state of use of the push service, onto the heartbeat. Like the mobile station, the push server sequentially stores information of the applications having made the request for use of the push service from the mobile station. Therefore, the push server determines the state of use of the push service for the corresponding application by analyzing the bitmap type information of the received message, then manages the state of use of the push service.

Thereafter, when the application App. 2 makes a request for interruption of the use of the push service, the mobile station stores the information of the corresponding application App. 2 in the memory, then transmits the information of the application App. 2 to the push server at the time of next transmission of the heartbeat. The message transmitted through the heartbeat may further include information indicating the state of use of the push service of all applications registered in the push server, and this information may be piggybacked in a bitmap type onto the heartbeat. The information of the application App. 2 may not be separately piggybacked. According to an embodiment of the present invention, the message transmitting using the heartbeat may include only information on the state of use of the push service by the applications, which has been changed after previous transmission of the heartbeat. The information of the application App. 2 is also piggybacked.

Then, when the application App. 1 makes a request for interruption of the use of the push service, i.e. a request for interruption of the use of the push service in all applications installed in the mobile station, the mobile station generates a request message requesting deregistration of the push service and transmits the generated request message to the push server. The transmitted request message does not include information on the application. Upon receiving the message, the push server terminates all the push service for the corresponding mobile station, and deletes both the information of the corresponding mobile station and the information of all application for the corresponding mobile station.

A push service management method according to an embodiment of the present invention has been described above with reference to related drawings. Hereinafter, a push service management apparatus according to an embodiment of the present invention will be described with reference to the related drawings.

Figure 8:
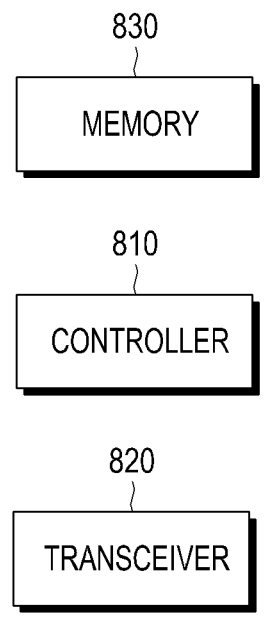
FIG. 8 is a block diagram of a push service management apparatus according to an embodiment of the present invention.

FIG. 8 is a block diagram illustrating a push service management apparatus according to an embodiment of the present invention.

Referring to FIG. 8, the push service management apparatus according to an embodiment of the present invention includes a controller 810, a transceiver 820, and a memory 830.

When there is a request for use of a push service from at least one application installed in the mobile station, the controller 810 determines whether another application using the push service exists, and determines a message type of a message to be transmitted to a push server to make a push service registration request depending on the determination of another application using the push service. Determining the message type of the message to be transmitted to the push server refers to determining whether to use the heartbeat or a separate message in the push service registration request. Further, the controller 810 configures a message requesting registration of the push service according to the determined message type.

When there is a request for use of the push service from at least one application installed in the mobile station and another application using the push service exists, the controller 810 stores information of the application requesting use of the push service in the memory 830. In addition, at the time of transmitting the next heartbeat, the controller 810 reads the information of the corresponding application requesting use of the push service from the memory 830, and then transmits the read information by piggybacking the read information onto a heartbeat. Information indicating the state of use of the push service in the mobile station for the application made the push service registration request, i.e. the application registered in the push server, may be further piggybacked.

According to an embodiment of the present invention, only the information indicating the state of use of the push service in the mobile station for the applications, which has been changed after transmission of the previous heartbeat, among the applications registered in the push server, may be piggybacked. When only the information indicating the state of use of the push service in the mobile station for the applications, which has been changed after transmission of the previous heartbeat, is piggybacked, the controller 810 also piggybacks the information of the corresponding applications onto the heartbeat. The information indicating the state of use of the push service may be transmitted in the bitmap format. In order to transmit the information in the bitmap format, the mobile station stores and manages the information of the applications requesting use of the push service in the same order as that in which the information is stored in the push server.

In addition, when there is a request for use of a push service from at least one application installed in the mobile station and another application using the push service does not exist, the controller 810 generates a separate request message for a push service registration request.

Further, when there is a request for interruption of the user of the push service from at least one application installed in the mobile station, the controller 810 determines whether another application using the push service exists, and determines a message type of a message to be transmitted to the push server to make a push service deregistration request depending on the determination of another application using the push service. Determining the message type of the message to be transmitted to the push server refers to determining whether to use the heartbeat or a separate message in the push service deregistration request. Further, the controller 810 configures a message requesting deregistration of the push service according to the determined message type.

When there is a request for interruption of the use of the push service from at least one application installed in the mobile station and another application using the push service exists, the controller 810 stores information of the application requesting interruption of the use of the push service in the memory 830. In addition, at the time of transmitting the next heartbeat, the controller 810 transmits the information of the corresponding application requesting interruption of the use of the push service by piggybacking the information onto a heartbeat. Information indicating the state of use of the push service in the mobile station for all applications making the push service registration request, i.e. all applications registered in the push server, may be further piggybacked. Information of the application making the push service deregistration request may not be separately piggybacked. According to an embodiment of the present invention, only the information indicating the state of use of the push service in the mobile station for the applications, which has been changed after transmission of the previous heartbeat, among the applications having made the push service registration request, i.e. the applications registered in the push server, may be piggybacked. When only the information indicating the state of use of the push service in the mobile station for the applications, which has been changed after transmission of the previous heartbeat, is piggybacked, the information of the corresponding applications is piggybacked together.

In addition, when there is a request for interruption of the use of the push service from at least one application installed in the mobile station and another application using the push service does not exist, the controller 810 generates a separate request message for a push service deregistration request. The message is configured not to include information on the application.

The transceiver 820 transmits a message received from the controller 810 to the push server and transfers a message received from the push server to the controller 810.

When there is a request for use of a push service from at least one application installed in the mobile station and another application using the push service exists, the memory 830 stores information of the application under the control of the controller 810. The stored information of the application is read out and transmitted to the push server at the time when the next heartbeat is transmitted. Further, when there is a request for interruption of the use of a push service from at least one application installed in the mobile station and another application using the push service exists, the memory 830 stores information of the application under the control of the controller 810. The stored 10 information of the application is read out at the time when the next heartbeat is transmitted, to be used for a push service deregistration request.

An operation and a structure of a mobile station according to an embodiment of the present invention has been described above with reference to related drawings. Hereinafter, an operation and a structure of a push server according to an embodiment of the present invention will be described with reference to the related drawings.

Figure 9:
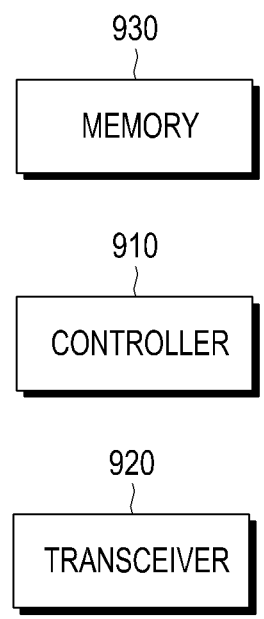
FIG. 9 is a block diagram of a push server according to an embodiment of the present invention.

FIG. 9 is a block diagram illustrating a push server according to an embodiment of the present invention.

The push server according to an embodiment of the present invention includes a controller 910, a transceiver 920, and a memory 930.

The controller 910 analyzes a message received through the transceiver 920 from the mobile station and determines whether the received message is a message making a push service registration request or a push service deregistration request.

When the received message is a message for a push service registration request and is a separate message that does not use a heartbeat, the controller 910 performs registration of the push service for the corresponding application and stores information of the corresponding application in the memory 930.

When the received message is a message for a push service registration request and is a message using a heartbeat, the controller 910 performs registration of the push service for the corresponding application according to the application information included in the message and stores information of the corresponding application in the memory 930.

When the received message is a message for a push service registration request and is a message using a heartbeat and if the message includes bitmap type information, the controller 910 manages the state of use of the push service of the applications registered in the push service based on the bitmap type information.

When the received message is a message for a push service deregistration request and is a message using a heartbeat and if the message includes bitmap type information, the controller 910 manages the state of use of the push service of the applications registered in the push service based on the bitmap type information included in the message.

When the received message is a message for a push service deregistration request and is a separate message that does not use a heartbeat, the controller 910 performs deregistration of the push service for all the applications of the mobile station and deletes information of all the applications and information of the mobile station.

Embodiments of the present invention described above may be implemented in various ways. For example, embodiments of the present invention may be implemented using hardware, software, or a combination thereof In the case of implementation by software, it can be implemented as software executed on a processor using various operation systems or platforms. Additionally, such software may be programmed in any one among a plurality of appropriate programming languages, and may be compiled as machine code or source code executed in a framework or virtual machine While the invention has been shown and described with reference to various embodiments thereof, it will be understood by those skilled in the art that various changes in form and detail may be made therein without departing from the spirit and scope of the invention as defined by the appended claims.

What is claimed is:

1. A method for managing a push service by a mobile station, the method comprising:
when there is a request for use of a push service from an application installed in a mobile station, determining whether another application using the push service exists;
determining a message type of a message to be transmitted to a push server to make a push service registration request depending on the determination of another application using the push service; and
configuring a message for a push service registration request according to a determined message type and transmitting the configured message to the push server.

2. The method of claim 1, wherein configuring the message for the push service registration request comprises:
when another application using the push service exists, piggybacking information of an application requesting use of the push service onto a heartbeat transmitted from the mobile station to the push server.

3. The method of claim 2, wherein configuring the message for the push service registration request further comprises:
piggybacking information on a push service use-state of the mobile station in relation to an application having made the push service registration request to the push server.

4. The method of claim 2, wherein configuring the message for the push service registration request further comprises:
piggybacking information on a push service use-state of the mobile station in relation to an application in which the push service use-state of the mobile station has been changed, among applications having made the push service registration request to the push server, and information on the application.

5. The method of claim 1, further comprising:
when there is a request to stop use of a push service from the application installed in the mobile station, determining whether another application using the push service exists;
determining a message type of a message to be transmitted to the push server to make a push service deregistration request depending on the determination of another application using the push service; and
configuring a message for a push service deregistration request according to a determined message type and transmitting the configured message to the push server.

6. The method of claim 5, wherein configuring the message for the push service deregistration request comprises:
when another application using the push service exists, piggybacking information of an application requesting to stop use of the push service onto a heartbeat transmitted from the mobile station to the push server.

7. The method of claim 6, wherein configuring the message for the push service deregistration request further comprises:
piggybacking information on a push service use-state of the mobile station in relation to an application having made the push service registration request to the push server.

8. The method of claim 6, wherein configuring the message for the push service deregistration request further comprises:
piggybacking information on a push service use-state of the mobile station in relation to an application in which the push service use-state of the mobile station has been changed, among applications having made the push service registration request to the push server, and information on the application.

9. The method of claim 6, wherein configuring the message for the push service deregistration request further comprises:
when another application using the push service does not exist, generating a separate request message for a push service deregistration request distinguished from the heartbeat.

10. The method of claim 9, wherein configuring the message for the push service deregistration request comprises:
configuring the separate request message to prevent the separate request message from including information on any application among the application installed in the mobile station.

11. An apparatus for managing a push service by a mobile station, the apparatus comprising:
a controller for, when there is a request for use of a push service from an application installed in a mobile station, determining whether another application using the push service exists, determining a message type of a message to be transmitted to a push server to make a push service registration request depending on the determination of another application using the push service, and then configuring a message for a push service registration request according to a determined message type; and
a transceiver for transmitting the configured message to the push server.

12. The apparatus of claim 11, wherein, when another application using the push service exists, the controller configures the message for the push service registration request by piggybacking information of an application requesting use of the push service onto a heartbeat transmitted from the mobile station to the push server.

13. The apparatus of claim 12, wherein the controller configures the message for the push service registration request by further piggybacking information on a push service use-state of the mobile station in relation to an application having made the push service registration request to the push server.

14. The apparatus of claim 12, wherein the controller configures the message for the push service registration request by further piggybacking information on a push service use-state of the mobile station in relation to an application in which the push service use-state of the mobile station has been changed, among applications having made the push service registration request to the push server, and information on the application.

15. The apparatus of claim 11, wherein, when there is a request to stop use of a push service from the application installed in the mobile station, the controller determines whether another application using the push service exists, determines a message type of a message to be transmitted to the push server to make a push service deregistration request depending on the determination of another application using the push service, and then configures a message for a push service deregistration request according to a determined message type.

16. The apparatus of claim 15, wherein, when another application using the push service exists, the controller configures the message for the push service deregistration request by piggybacking information of an application requesting to stop use of the push service onto a heartbeat transmitted from the mobile station to the push server.

17. The apparatus of claim 16, wherein the controller configures the message for the push service deregistration request by further piggybacking information on a push service use-state of the mobile station in relation to an application having made the push service registration request to the push server.

18. The apparatus of claim 16, wherein the controller configures the message for the push service deregistration request by further piggybacking information on a push service use-state of the mobile station in relation to an application in which the push service use-state of the mobile station has been changed, among applications having made the push service registration request to the push server, and information on the application.

19. The apparatus of claim 16, wherein, when another application using the push service does not exist, the controller generates a separate request message for a push service deregistration request distinguished from the heartbeat.

20. The apparatus of claim 19, wherein the controller configures the separate request message to prevent the separate request message from including information on any application among the application installed in the mobile station.

21. A method for a mobile station to manage a push service, the method comprising:
when there is a request for use of a push service from an application installed in a mobile station, determining whether another application is currently using the push service;
when another application is currently using the push service whose use is being requested by the application, configuring a heartbeat message for the another application to also carry a request for registering the push service for the application.

* * * * *